(12) United States Patent
Clark (10) Patent No.: US 11,069,002 B2
(45) Date of Patent: Jul. 20, 2021

(54) USER INTERFACES FOR A TAX RETURN APPLICATION

(71) Applicant: HRB Innovations, Inc., Las Vegas, NV (US)

(72) Inventor: Mary Clark, Lee's Summit, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 130 days.

(21) Appl. No.: 15/785,702

(22) Filed: Oct. 17, 2017

(65) Prior Publication Data

US 2019/0114720 A1 Apr. 18, 2019

(51) Int. Cl.
*G06Q 40/00* (2012.01)
*G06F 3/0481* (2013.01)

(52) U.S. Cl.
CPC ......... *G06Q 40/123* (2013.12); *G06F 3/0481* (2013.01)

(58) Field of Classification Search
CPC .... G06Q 40/123; G06Q 10/06; G06F 3/0481; G06F 10/06313
USPC .......................................................... 705/31
See application file for complete search history.

(56) References Cited

U.S. PATENT DOCUMENTS

| 7,131,069 B1* | 10/2006 | Rush ..................... G06F 3/0482 715/738 |
| 2011/0145034 A1* | 6/2011 | Moore .................. G06Q 10/00 705/7.17 |
| 2015/0046207 A1 | 2/2015 | Hurd et al. |
| 2015/0213551 A1 | 7/2015 | Boyanov et al. |
| 2016/0350870 A1* | 12/2016 | Morin .................. G06Q 40/123 |
| 2017/0308960 A1* | 10/2017 | Mascaro ................ G06N 20/20 |
| 2018/0150913 A1* | 5/2018 | Wang .................. G06Q 40/123 |

* cited by examiner

*Primary Examiner* — Scott C Anderson
*Assistant Examiner* — Marla Hudson
(74) *Attorney, Agent, or Firm* — Erise IP, P.A.

(57) ABSTRACT

Media, method and system are described for creating and operating software capable of performing steps to provide a user with an estimated amount of time until a tax return application may be completed. Embodiments of the invention consider the availability of documents in physical or electronic form. Embodiments of the invention further display the time estimation to enable a user to reserve enough time for completion of the application.

20 Claims, 7 Drawing Sheets

Input Physically Available Documents:

Search: [_______________________ /—702]

706—☐  W-2  ←—704

☐  1099

☐  Pay Stub

☐  Moving Receipts

☐  IRA Contribution Form

☐  Bank Statements for Investment Home

☐  Medical Savings Account Statement

☐  Proof of Childcare Cost

FIG. 7

USER INTERFACES FOR A TAX RETURN APPLICATION

BACKGROUND

1. Field

Embodiments of the invention are broadly directed to methods and systems for producing a user interface informing a user of an estimated amount of time remaining until completion of a tax return application. Specifically, embodiments of the invention calculate an estimated time until completion of an application based upon factors such as the handiness of documents and pace of completion, and present them to a user on a convenient visual display.

2. Related Art

Preparation of tax return applications can often cause anxiety for a variety of reasons, especially for someone who is inexperienced in application preparation, short on time, and/or missing important documentation. Even for a well-practiced or professional tax application preparer, it can be difficult to accurately judge the amount of time that will be required to complete an application. This is because the amount of time required can depend on several factors, such as the availability of documentation, the pace of the preparer, and the complexity of the application. Further, it is particularly difficult to assess how much time remains on a partially completed tax application, regardless of how experienced a preparer may be.

Accordingly, there is a need for improved systems and methodologies to calculate and display an estimated amount of time required for completion of preparation of a tax application, whether it is fully or partially incomplete. Further, there is a need for a simple, straightforward user interface that may accept user input, present a calculated time estimate, assist in document assessment and collection, and/or allow for displaying of achievement of notable checkpoints.

SUMMARY

Embodiments of the invention address this need by generating and displaying user interfaces that include an expression of a calculated estimate of the amount of time until a tax application is completed. Embodiments of the invention may further include steps of updating the calculated time estimate upon triggers such as an achieved checkpoint or user request. Embodiments of the invention display this estimated time for completion of the tax application using various techniques and display parameters.

In a first embodiment, a method of producing a user interface for informing a user of an estimated amount of time remaining until completion of a tax return application begins with a collection of a plurality of deductions to be completed on the application. From this collection, a set of resources necessary for completion of the application is determined manually by a user and/or by a computer processor. Next, sets of electronically available and physically available documents are generated that address a subset of the necessary resources. At this point, a set of remaining resources, which are not satisfied by any of the physically or electronically available documents, is determined in order to calculate an estimated time to complete the tax return application. A user interface is then generated including an expression of this calculated time and displayed to the user. In some embodiments, the method may further generate an adjusted user interface based on updated information upon a trigger such as a user request or achievement of a checkpoint.

In a second embodiment, a computer-readable medium stores computer-executable instructions which, when executed by a processor, perform a method of producing a user interface estimating an amount of time until completion of a tax return application beginning with a collection of a plurality of deductions to be completed on the application. From this collection, a set of resources necessary for completion of the application is determined manually by a user and/or by a computer processor. Next, sets of electronically available and physically available documents are generated that address a subset of the necessary resources. At this point, a set of remaining resources is determined in order to calculate an estimated time to complete the tax return application. A user interface is then generated including an expression of this calculated time and displayed to the user. In some embodiments, the step of calculating a time to complete the tax return application may be based, at least in part, on a pace of preparation, the time required for other users to complete a similar application, and/or the length of time required by the user to complete a previous tax return application.

In a third embodiment, a method of producing a user interface for informing a user of an estimated amount of time remaining until completion of a tax return application begins with manual selection by a user of a plurality of deductions to be completed on the tax return application. From this collection, a set of resources necessary for completion of the application is determined manually by a user and/or by a computer processor. Next, sets of electronically available and physically available documents are generated that address a subset of the necessary resources. At this point, a set of remaining resources, which are not satisfied by any of the physically or electronically available documents, is determined in order to calculate an estimated time to complete the tax return application. A user interface is then generated including an expression of this calculated time and displayed to the user. In some embodiments, the user interface generated may include a countdown timer, a graphical clock, a textual statement of an estimated time remaining, a graphical indication of the percent completion of the tax application, and/or an indication of the set of remaining resources.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention are directed to media, methods, and systems for producing user interfaces including at least one expression of a calculated estimate of the amount of time that will be required to complete a tax return application. Embodiments of the invention may be applied in any situation in which such an estimation would be beneficial or appreciated, by casual or professional tax preparers working on a wholly or partially incomplete tax application.

A tax return is essentially a report filed with the appropriate government taxing authority, such as the Internal Revenue Service in the case of U.S. federal income tax. Typically, the tax return contains information used to calculate an amount of tax due. Typically, the tax return is either printed or hand-written on a form generated by the taxing authority, such as the Form 1040. However, the tax return could be on another type of form, a financial document, or other document. On the tax return, the taxpayer or tax preparer calculates the taxes due. To assist in the calculation and to allow the taxing authority to verify the calculations, the tax return contains pertinent information associated with the taxpayer for the tax year. The tax return can be either written, digital, or a combination of both. In other embodiments, information relevant to the taxpayer and the tax to be paid are provided on other various forms and documents, such as a Form W2 or a Form 1099.

In embodiments of the invention, the system may also receive or otherwise acquire tax returns from previous years and/or relevant to other taxing authorities for the current and/or previous years, financial records, and bank statements. In some embodiments, all of the information is received by the computer program as a single set. In other embodiments, the computer program may query the user to input additional information. The taxpayer may also provide information to the system that the tax preparer does not have access to, such as financial records and bank statements.

In embodiments of the invention, further implications such as programs, code sections, benefits, and other aspects of the tax code that change a tax liability for the taxpayer may be determined by a user and/or processor. Implications may also originate in regulations, rulings, administrative agencies, and entitlement programs. For example, implications may include income sources, tax deductions, and tax credits. More specific examples of deductions include trade and business deductions, losses from sale or exchange of property, deductions from rents and royalties, pensions and annuities, retirement savings, alimony, moving expenses, interest on educational loans, higher education expenses, health savings accounts, startup expenses, expenses for determining tax owed, management of rental properties, charitable donations, medical care, various types of interest, depreciation, creation of a corporation, losses in a business or trade, business meals, entertainment related to business, trade and business education, state and local taxes. More specific examples of tax credits include taxes withheld, earned income tax credit (both of which are refundable credits), dependent care credits, child credits, Individual Retirement Account (IRA) contributions, and education expenses such as the Hope Scholarship and the Lifetime Learning Credit. Other implications may also be allowed by law, regulation, rulings, or other origin.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

It should be appreciated that some embodiments of the invention are a tax return preparation program (such as an at-home tax preparation program or a professional tax preparation program). Other embodiments may be ancillary or secondary functions associated with a tax preparation program. A set of taxpayer information may additionally or alternatively be received. The set of taxpayer information may include additional known information about the taxpayer, such as account information, previous year tax returns, qualitative information, quantitative information, or other information known about the taxpayer.

It should be appreciated that in embodiments of the invention, the discussed steps may be performed before or during completion of the tax return, upon the user reaching a certain step in the completion of the tax return, upon specific request of the user, as a premium feature available to the user, upon a user returning to restart the tax preparation program, upon a user providing an indication of completion of the tax return, or at another time. For example, the below discussed steps may be performed while the taxpayer or other user is providing information to a tax return preparation program. As a more specific example, upon the input of income information, the steps discussed below may be begun before presenting the user time requirement information. The steps may be performed periodically such that the steps may be performed more than once during the preparation of the tax return. Successive iterations of the below-discussed steps may include updated and additional information that is received later from the user.

The taxpayer user may include any entity, including a legal or natural person, that files a tax return with a government taxing authority. The user may also be a married couple or other plurality of individuals filing a single tax return. Taxes to be paid can be United States Federal Income Tax, income tax for the various states within the United States, corporate taxes, partnership taxes, LLC taxes, property taxes, tariffs, or other taxes. Typically, the taxpayer user provides information relevant to themselves and the amount of tax owed in the form of the tax return (based upon incomes, expenses, and the like). The tax return application may therefore include information indicative of the employer and other external entities to which the taxpayer is or may be associated. The tax return application may also include information indicative of various benefits that the taxpayer is utilizing (or has utilized during the tax year).

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Figure 1:
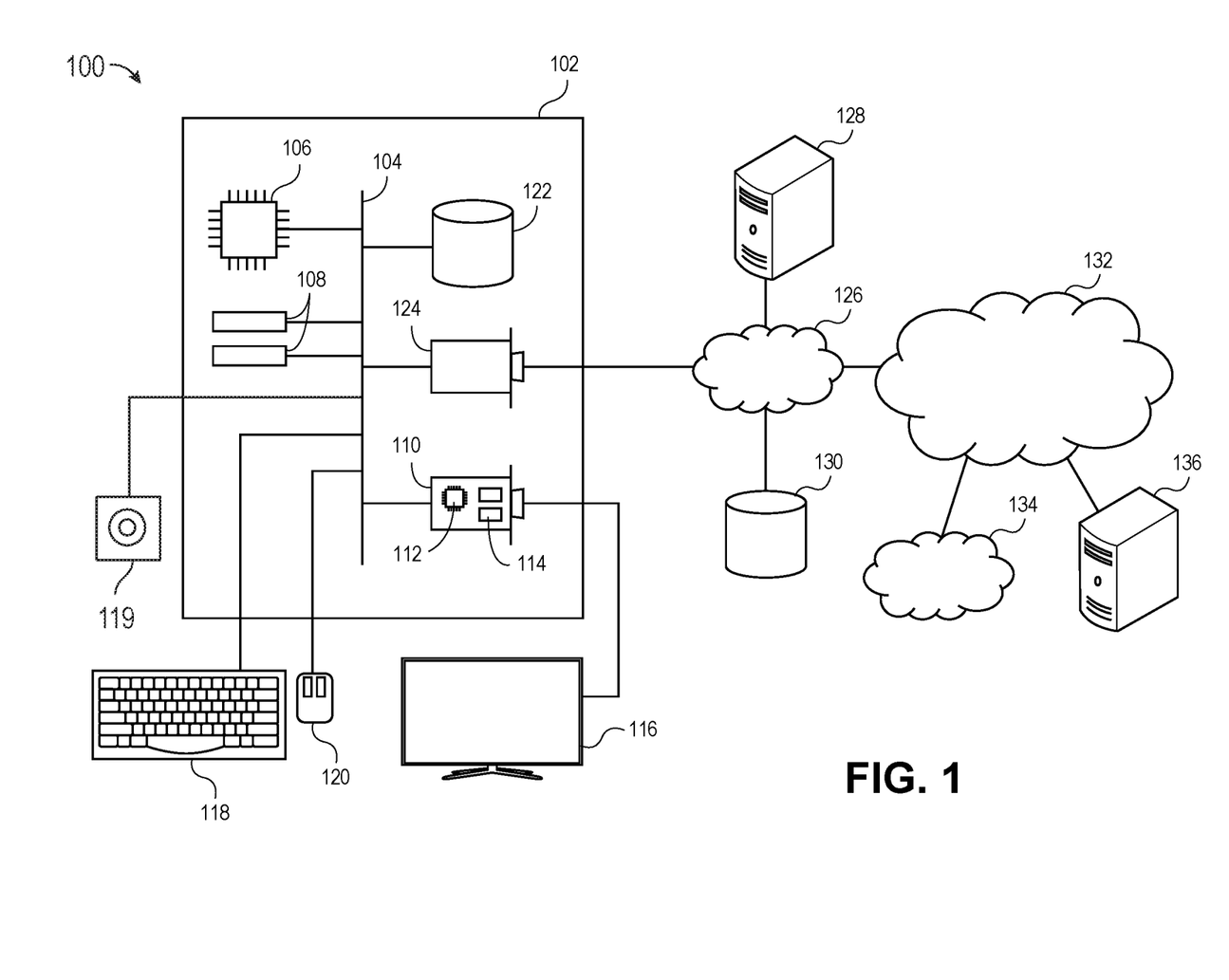
FIG. 1 depicts an exemplary hardware platform for certain embodiments of the invention.

Turning first to FIG. 1, an exemplary hardware platform 100 that may be utilized for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106.

In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118, scanner 119, and mouse 120 are connected to system bus 104. Like display 116, these peripherals may be integrated into computer 102 or absent. Scanner 119 may comprise any optical capture device, including but not limited to a flatbed scanner, digital camera, facsimile image capture device, or any other hardwired or wirelessly connected hardware capable of capturing visual data. Also connected to system bus 104 is local storage 122, which may be any form of computer-readable media, and may be internally installed in computer 102 or externally and removably attached.

Computer-readable media include both volatile and non-volatile media, removable and non-removable media, and contemplate media readable by a database. For example, computer readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, Automatic Teller Machine (ATM), fiber, BLUETOOTH™ (BLUETOOTH is a registered trademark of BLUETOOTH SIG), or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP (Lightweight Directory Access Protocol) and Active Directory, cloud storage, and/or email storage systems. A data store may be accessible via a complex API (Application Programming Interface) (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132. In some embodiments, steps of methods disclosed may be performed by a single processor 106, single computer 128, single memory 108, and single data store 130, or may be performed by multiple processors, computers, memories, and data stores working in tandem.

Operation of Embodiments of the Invention

As discussed above, embodiments of the invention calculate an estimated amount of time required to complete a tax return application based, at least in part, on the availability of documents satisfying the array of resources necessary for the particular application. For example, a user attempting to complete a very simple tax return application, with very few line-item deductions and would have a very short estimated time to completion, especially if all of the documents necessary for the application are already at-hand or, better yet, electronically uploaded to computer 102 or data store 130. Conversely, a user attempting to complete a complex or lengthy tax return application would have a very long estimated time to completion, especially if many of the documents necessary for the application are not in the user's possession, either electronically or physically.

Figure 2:
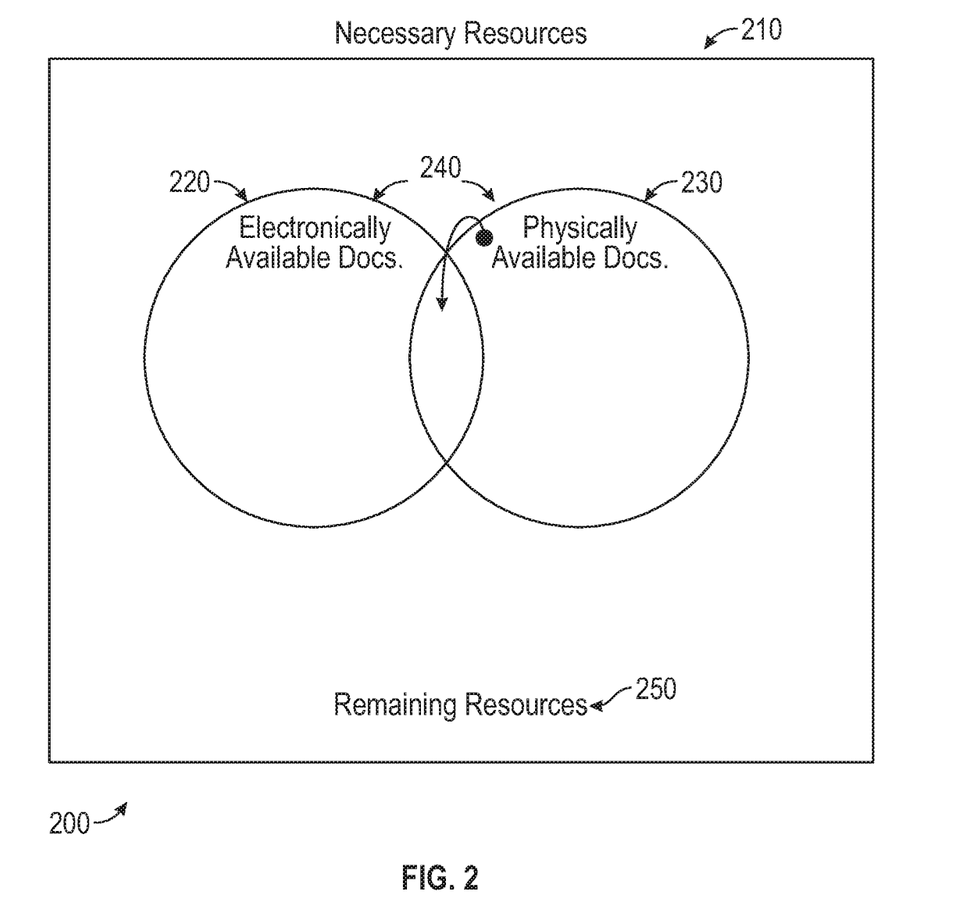
FIG. 2 illustrates resources necessary for completion of a tax application.

FIG. 2 represents conceptually the resources 200 being discussed. Based on the length and/or complexity level of a particular tax return application, a set of necessary resources 210 may be generated by a user and/or processor 106. These necessary resources 210 represent each of the line-item facts on the application that must be known for completion of the application, and proven in the event of an audit. For example, the necessary resources 210 may include proof of wages, taxes withheld, moving expenses, student loan or mortgage interest, contributions to an Individual Retirement Account (IRA) or Medical Savings Account (MSA), or rental property income. This list is not meant to be exhaustive, only illustrative, and should not be construed as limiting in any way. Any proof necessary for completion of a tax return application may be included in embodiments of the invention.

These necessary resources 210 may be satisfied by a wide variety of documents 240. For example, a benefit verification letter may constitute a document 240 satisfying a necessary resource 210 of proof of social security benefits for a tax return application claiming such a deduction. In some cases, a single document 240 may satisfy multiple necessary resources 210, as in the case of a Form W-2 providing proof of both wages and taxes withheld. Examples of other documents 240 that may satisfy the necessary resources 210 include a Form 1099 or 1099-MISC, purchase receipts IRA contribution forms, bank or Medical Savings Account statements, or bills for childcare costs. Again, this list is not meant to be exhaustive, only illustrative, and should not be construed as limiting in any way. Any documentation that may be utilized for completion of a tax return application may be included in embodiments of the invention.

A particular piece of documentation 240 may be available in electronic or digital form and/or may be physically in the possession of a user. For purposes of discussion, these will be referred to as electronically available documents 220 and physically available documents 230. The term "available" is meant to denote that the particular document 240 is accessible by the user and/or processor 106 at the time of a use of an embodiment of the invention. For example, in embodiments of the invention, if a user is not in possession of their W-2, either physically or electronically, it is not an "available" document, even if the user could procure it through a simple request to his employer. Further, as will be discussed in greater detail below, a particular document 240 may be both electronically available and physically available, such as in the case of an email which has been printed or a receipt which has been optically scanned into computer 102 by a scanner 119.

While either of these levels of availability of a document may satisfy the need for proof, there exists a relevant difference in the amount of time needed to complete a tax return application for one over the other—namely that tax deductions are typically completed more quickly when using electronically available documents 220 rather than physically available documents 230. This may be because fields of an electronic tax return application may be automatically filled by processor 106 based on data from an electronically available document, or may be simply due to the convenience, efficiency, and speed of an electronic filing system over a paper filing system. Regardless of the particular cause, in embodiments of the invention, an estimate of the amount of time required for completion of a tax return application is calculated based on which documents are available electronically and which documents are only available physically.

Further, embodiments of the invention estimate the amount of time required for completion of a tax return application based on remaining resources 250, those outstanding resources which are needed for completion and proof of the tax return application but are not satisfied by any of the electronically available documents 220 or the physically available documents 230. These remaining resources typically represent a great fraction of the total time estimated for completion of a tax return application, due to both the time required to determine what types of documents would qualify to satisfy the remaining resources and the time required to actually acquire them.

Figure 3:
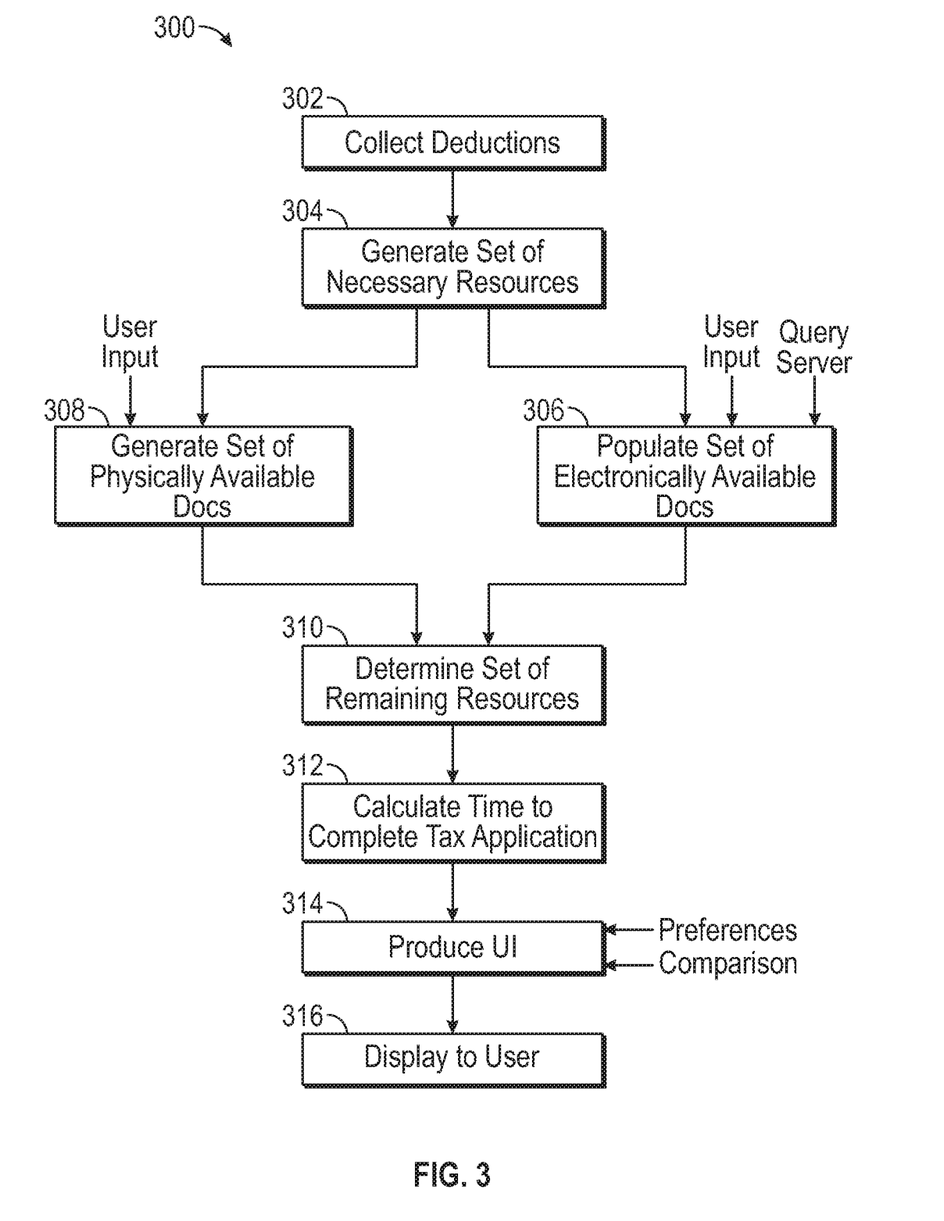
FIG. 3 depicts a first flowchart illustrating the operation of a method in accordance with an embodiment of the invention.

Illustrated in FIG. 3 is a method 300 stored in computer-executable instructions on a non-transitory computer readable medium according to an embodiment of the invention beginning at step 302, in which a plurality of deductions are collected for completion of a tax return application. In some cases, this may be all of the deductions for a new application, may be a portion of the deductions to be completed on an application, or may be the remaining deductions on a partially completed application. In some embodiments, the plurality of deductions are collected automatically by a processor based on a tax application stored in memory 108 and/or retrieved from a data store 130. In other embodiments, some or all of the plurality of deductions to be completed may be manually indicated by a user through input such as the click of a mouse, a vocal selection of deductions, or a tap on a touchscreen. This step 302, as well as any or all of the other steps of FIG. 3, may be initiated and/or performed in response to a user request, such as a selection of an on-screen button.

At step 304, based on the plurality of deductions collected in step 302, a set of necessary resources 210 is generated by processor 106. The set of necessary resources 210 may comprise a list stored in memory 108 and/or at data store 130 of attributes that must be represented by documents 240 in order to complete the application.

At step 306, a set of electronically available documents 220 is generated to begin satisfying the attributes required by the plurality of resources (Step 304) necessary for completion of the deductions collected for the tax return application. In embodiments, some or all of the set of electronically available documents 330 may be determined automatically by processor 106 based on documents stored in memory 108, data store 130, other attached memory. Further, in embodiments, electronically available documents 220 may include documents electronically available for completion of a previous tax return application, such as a previous year's application and/or that of a spouse filing separately. Particularly, at least one document in the set of electronically available documents 220 may have been stored in a remote database 130 by the user during completion of a prior tax return application. In some embodiments, the set of electronically available documents 220 are determined completely without user input.

In yet further embodiments, electronically available documents 220 may be manually indicated by a user via input, such as a click of mouse, a vocal selection, or a tap on a touchscreen, or may be automatically included in the set 220 upon optically scanning a document using scanner 119. In embodiments, scanner 119 may scan the entirety of a physical document to create an electronic document, may scan only a portion of the document to retrieve desired data, and/or may scan a machine readable code symbol such as a bar code from the document to automatically load data and/or query a remote data store 130 to retrieve information. In other embodiments, a data store 130 may be queried in response to a user input of a username, password, and/or network address.

Scanning a physically available document 230 transforms it into an electronically available document 220, in embodiments. Doing so, through a process such as uploading the physically available document via an optical capture device, may remove the document from the set of physically available documents 230 and add it to the set of electronically available documents 220, as indicated by arrow 260 in FIG. 2. Alternatively, scanning and uploading a physically available document 230 may add it to the set of electronically available documents 220 without removing it from the list of physically available documents.

Similarly, at step 308, a set of physically available documents 230 is generated to continue satisfying the attributes required by the plurality of necessary resources (Step 304). In embodiments, the set of physically available documents 220 is generated based on input from a user, which may be accomplished through a user interface screen as described below with respect to FIG. 7. For example, a user may indicate that she is in possession of a physical copy of her W-2, a 1099-MISC form, and receipts for moving expenses in paper form. Further, in embodiments, physically available documents 230 may include documents electronically available for completion of a previous tax return application, such as a previous year's application and/or that of a spouse filing separately. Any or all of these documents may also be available in electronic form as discussed above, in embodiments of the invention. In alternative embodiments, the set of physically available documents 230 collected in step 308 may be only those documents 240 which are not part of the electronically available documents 220 collected in step 306.

In step 310, the difference between the necessary resources 210 and the attributes satisfied by the electronically available documents 220 and the physically available documents 230 is evaluated by processor 106 to determine a set of remaining resources 250. The remaining resources 250 represent those attributes that must be addressed by the user through acquisition and/or indication of additional physical and/or electronic documentation before the tax return application can be completed. As mentioned above, these remaining resources 250 often contribute a large portion of the time required for completion of a tax return application.

At step 312, a time to complete the tax return application is calculated based, at least in part, on the set of electronically available documents 220, the set of physically available documents 230, and the set of remaining resources 250. As further discussed below, this calculation step 312 may be performed further based, at least in part, on an average time required for completion of tax return applications by a selected set of other users, on a pace of completion of the plurality of deductions, a length of time required for the user to complete a previous tax return application, and/or other factors specified by the user or system.

In some embodiments, particular remaining resources 250 may contribute a set number of minutes to the calculated estimate of time required based on an average taken across a population of tax preparers such as all preparers using the invention for the current or previous year. For example, suppose all users from the previous year missing proof of contributions to a MSA required an average of 30 minutes longer to complete a tax return application. In step 312, processor 106 may recognize this deficiency in a user's remaining resources 250, query database 130 for the contribution that a missing proof of contributions to a MSA, and add 30 minutes to the overall estimation of time required for completion of the application. In other embodiments, the contributions due to particular remaining resources 250 and/or physically available (but electronically unavailable) documents may be stored in memory 208 or retrieved from the internet 132.

At step 314, a user interface is generated by processor 106 including an expression of the calculated time to complete the tax return application. As discussed below with reference to FIG. 6, this user interface or element thereon expression of the calculated estimation may comprise a countdown timer, a graphical clock, and/or a textual statement of an estimated time remaining. The user interface may include other elements, such as a graphical indication of the percent completion of the tax application or an indication of the set of remaining resources 250 that remain for acquisition and/or indication by the user. At step 316, the user interface is displayed to the user via display 116.

In some embodiments, the calculated time remaining to complete the tax return application may be adjusted based on updated and/or further information, and displayed to the user on display 116. This updating process may be performed continuously, in response to a trigger event such as a user request for an updated time calculation or upon achievement of a sensed "checkpoint." Other trigger events for updating of a user interface may include an adjustment in settings or an addition or subtraction of a deduction to be completed.

A checkpoint is an accomplishment such as completion of a deduction, transformation of a physically available document 230 to an electronically available document 220 through scanning, typing, or dictation, or acquisition of a remaining resource 250. Other possible checkpoints include a threshold percent completion of the tax application or expiration of a threshold number of minutes (or other units of time). In embodiments, checkpoints may be displayed to the user on the user interface for motivation and/or informational purposes. Additionally or alternatively, upcoming and/or nearly accomplished checkpoints may be presented.

Figure 4:
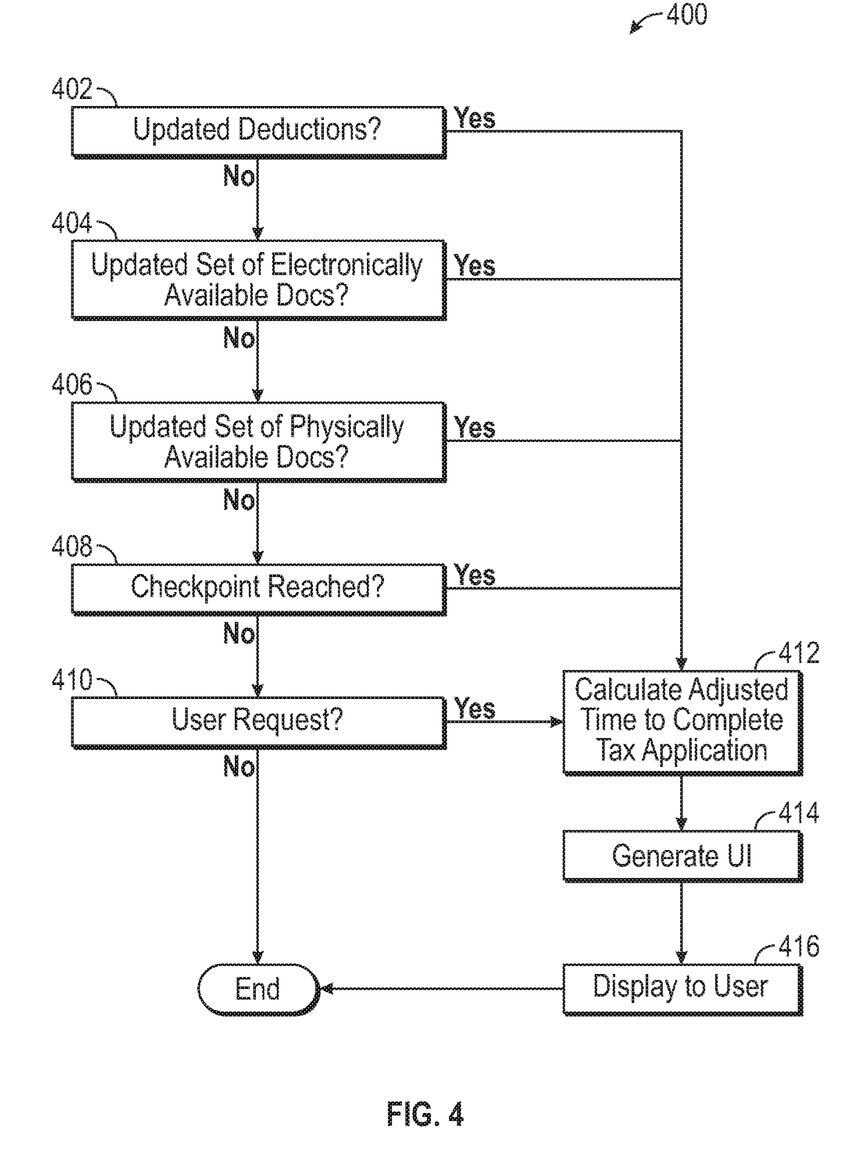
FIG. 4 depicts a second flowchart illustrating the operation of a method in accordance with an embodiment of the invention.

FIG. 4 illustrates a process by which a user interface generated in the process of FIG. 3 may be updated continuously in response to one of these trigger events. FIG. 4 begins at step 402, in which processor 106 determines if the plurality of deductions for completion has been updated, either through completion, addition, and/or subtraction. If no, in steps 404 and 406, the processor 106 then determines if the set electronically available documents 220 or physically available documents 230 have been updated (Step 404) or if the set of physically available documents 220 have been updated (Step 406). In embodiments, the results of steps 404 and 406 may be Yes in response to an addition, uploading, or linking of an electronically available document, user indication of acquisition of a physically available document, and/or transformation of a physically available document to an electronically available document through scan, photograph, character recognition, or other optical capture. Further, the results of steps 404 and 406 may be Yes in response to a removal, subtraction, deletion, or unlinking of an electronically available document 220 or user indication of a loss of a physically available document 230, which may serve to increase the calculated time to complete the tax return application.

In step 408, processor 106 may periodically or continuously check for completion of a checkpoint indicating user accomplishment of one or more goals indication progress in completion of the tax return application, as described above. These goals may be predefined by the user and stored in memory 108, may be loaded from a template or user profile in data store 130, and/or may be drawn from a standard set of checkpoints provided for all users. In an embodiment, some or all checkpoints may be automatically determined by the processor 106 based, at least in part, on the plurality of deductions to be completed on the tax return application, the set of physically available documents 230, the set of electronically available documents 220, and/or the set of remaining resources 250.

For example, a user working on a tax return application may choose a deduction that requires provision of a 1099 form that is currently not in the user's possession, constituting a remaining resource 250. Upon uploading the 1099 form via photo capture from the user's smartphone (a scanner 119), processor 106 may indicate the achievement of a checkpoint, causing the method 400 to progress to step 412, as described below. Further, an indication of achievement of the checkpoint may be presented to the user on the user interface.

Finally, in step 410, processor 106 may periodically or continuously poll the input devices for a user request indicating a desire for an updated user interface including an adjusted time to complete the tax return application. In embodiments, steps 402 through 410 may be performed in any order, further steps may be performed, or any of these steps may be omitted.

If the result of any of steps 402 through 410 is "Yes," then in step 412 an adjusted time to complete the tax return application is calculated by processor 106 as before in step 312 of FIG. 3, based now on the adjusted or updated information. In step 414, an adjusted user interface is generated including an expression of the adjusted time for completion as well as possibly other elements such as an indication of update, the time of update, the reason for update, or any other user element herein described. The adjusted user interface is displayed to the user in step 416 on display 116.

In some embodiments, calculation of a time to complete a tax return application may be performed based, at least in part on other factors, such as time required for a previous completion, time required by other similar users, or pace of completion of the current application. As shown in method 500 of FIG. 5, processor 106 may, based on user selection and/or predefined instruction, collect data from memory 108, internet 132, and/or data store 130 to perform the time requirement calculation.

Figure 5:
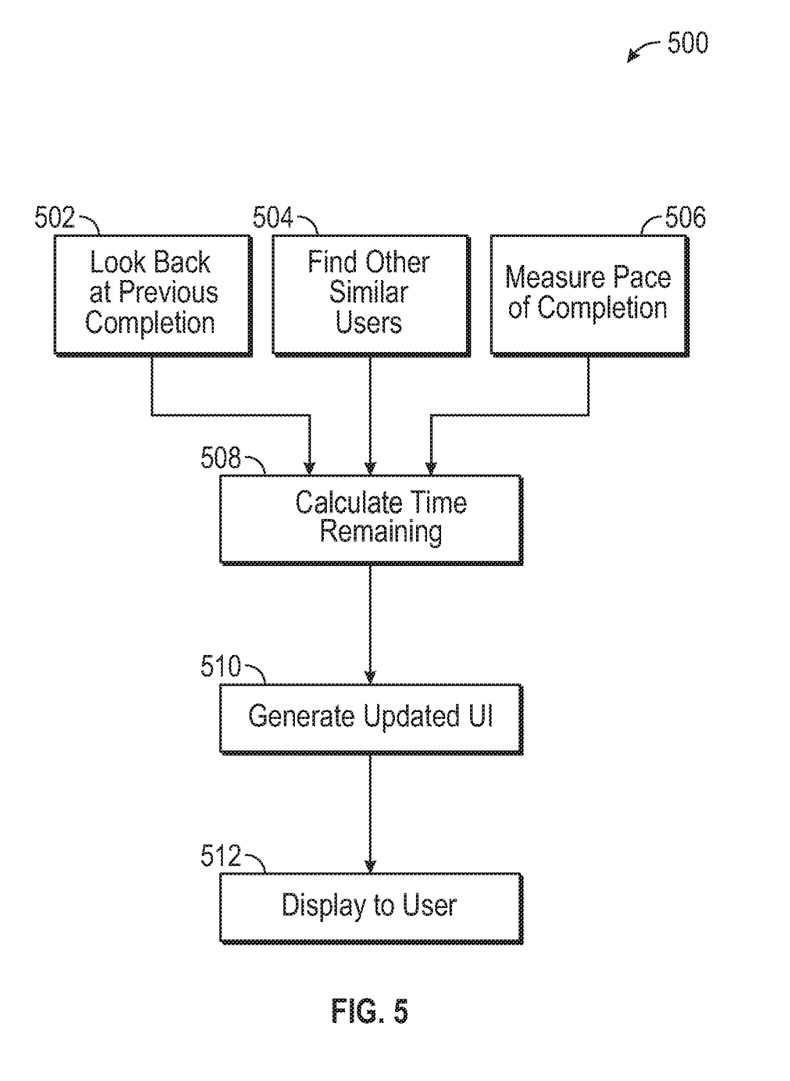
FIG. 5 depicts a third flowchart illustrating the operation of a method in accordance with an embodiment of the invention

FIG. 5 begins at step 502, in which processor 106 retrieves data indicative of the amount of time required for the current user to complete a previous tax return application. This previous completion could be, for example, from a previous year. Embodiments may take an average of the time required by the user for all previous tax return application completions, a function that may be of particular use to a professional who prepares a large number of tax return applications per year.

Similarly, at step 504, processor 106 retrieves data indicative of the amount of time required for similar users to complete a tax return application. Data on a set of similar other users may be retrieved from internet 132 or data store 130, and may be collected by a third-party. Such time requirement data may, in embodiments, be based on tests previously run with sample users to determine average times for completion of tax return applications with an array of deductions for completion, electronically available documents 220, physically available documents 230, and/or remaining resources 250.

Specifically, in embodiments, the set of other users may selected based, at least in part, on those users having collected a remaining resource in common with a remaining resource in the user's set of remaining resources. Additionally or alternatively, the set of other users may selected based, at least in part, on having one or more deductions in common with the plurality of deductions collected for completion by the first user, the set of electronically available documents 220, and/or the set of physically available documents 230. Factors contributing to what characteristics define a set of similar users for calculation of a first user's estimated time to completion may be predetermined for all users and/or set manually by the first user. As before, embodiments may take an average of the time required by all users in the set of other similar users for calculating the time remaining to complete a tax return application.

For example, a user claiming deductions based on education expenses and missing proof of those expenses may indicate that the estimated time to completion should be calculated based on other users this tax season who were in need of the same remaining resources 250. Processor 106 may communicate with data store 130 to retrieve this information and adjust the user interface to display a time remaining corresponding to the average of all users missing such documentation this year. In other embodiments, other users missing similar resources may not be restricted to the current calendar or tax year.

In step 506, processor 106 may observe, collect, and or retrieve from memory 108 or data store 130 information regarding the pace of completion of the current tax return application by the user. For example, this may include the number of minutes required to complete a deduction, pace of conversion of physically available documents to electronically available documents, or average length of time required to acquire a missing remaining resource.

At step 508, the information collected or retrieved in steps 502-506 is used to generate and/or adjust a user interface element expressing the amount of time required to complete the tax return application. At step 510, the user interface is generated, which is then displayed to the user in step 512. In embodiments of the invention, any combination, all, or none of steps 502-504 may be used to calculate an initial or adjusted user interface for presentation to a user.

Figure 6:
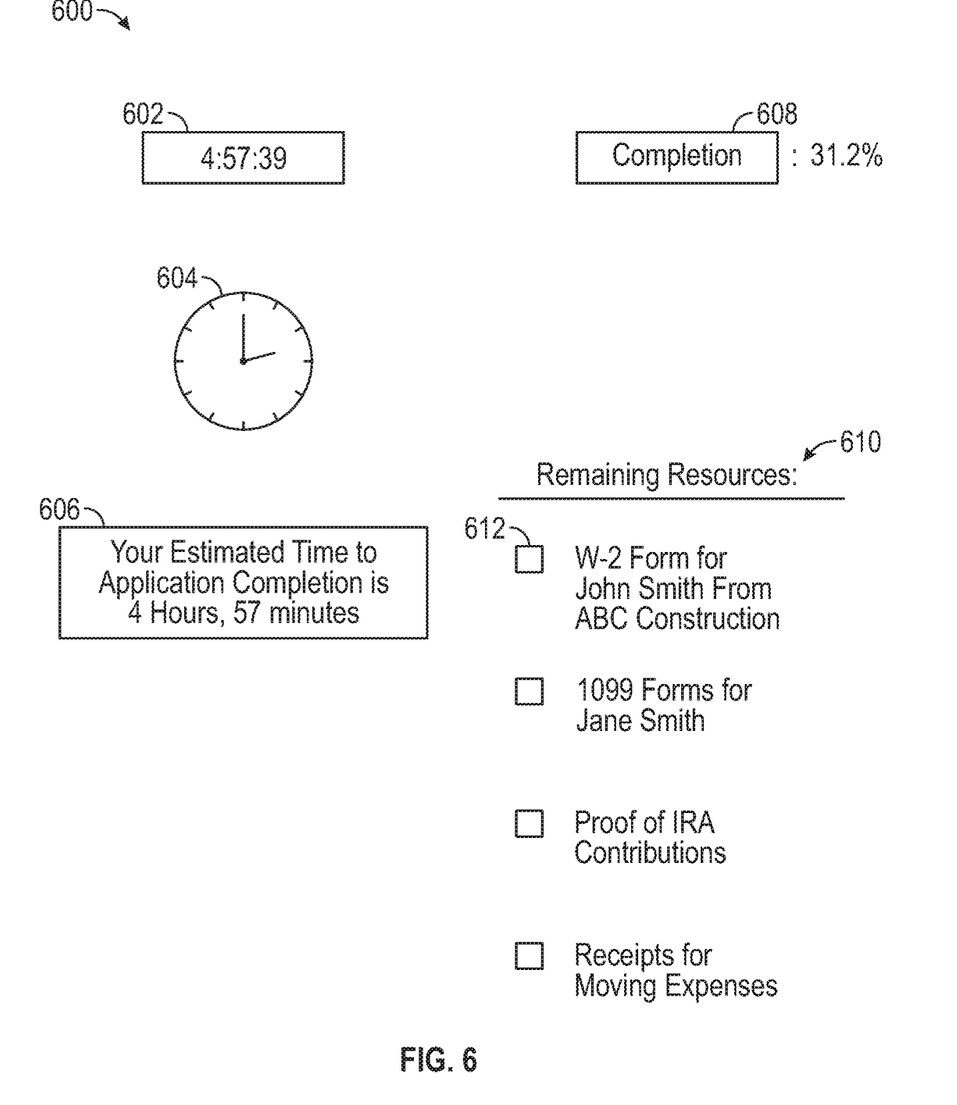
FIG. 6 illustrates example user interface elements that may be generated in embodiments of the invention.

Examples of user interface elements that may be presented to a user in embodiments of the invention are illustrated in FIG. 6. The elements illustrated are intended merely as exemplary, and any or all of them may be configured, arranged, positioned, or sized differently, or may be omitted altogether.

Elements 602 through 606 illustrate possible expressions of the amount of time calculated for completion of a tax return application. Element 602 illustrates a countdown timer expressing a calculated estimation of time remaining until completion of a tax return application. The timer 602 may have, for example, originally been set to a calculated time of 5 hours, and began ticking down from the moment it was displayed to a user. Similarly, element 604 expresses a graphical clock that may express an expected time of day that the tax return application is expected to be completed or may alternatively display a stopwatch ticking towards completion. Element 606 provides yet another alternative expression of the amount of time until expected completion of the tax return application, this time presenting a textual statement of the estimated time remaining. Any or all of elements 602 through 606 may be presented on a user interface in embodiments of the invention, or alternative expressions may be produced. In embodiments, any of these elements may comprise the entire user interface, may be included with other user interface elements such as elements 608 or 612, or may be superimposed on another user interface such as a spreadsheet application.

Element 608 illustrates a completion percentage of the plurality of deductions being presented to the user on the user interface. The percentage 608 may update continuously, periodically, or automatically in response to triggers or a user request, as described above.

Element 610 presents on the user interface, alongside the expression(s) of the calculated time to complete the application, a set of the remaining resources 250 that the user must acquire. When acquired, a user may indicate possession of a document through interaction with the user interface such as by clicking an electronic checkbox 612. This may cause a representation of an achieved checkpoint to display on interface 600 and/or updating of any of elements 602 through 610 in embodiments of the invention.

Figure 7:
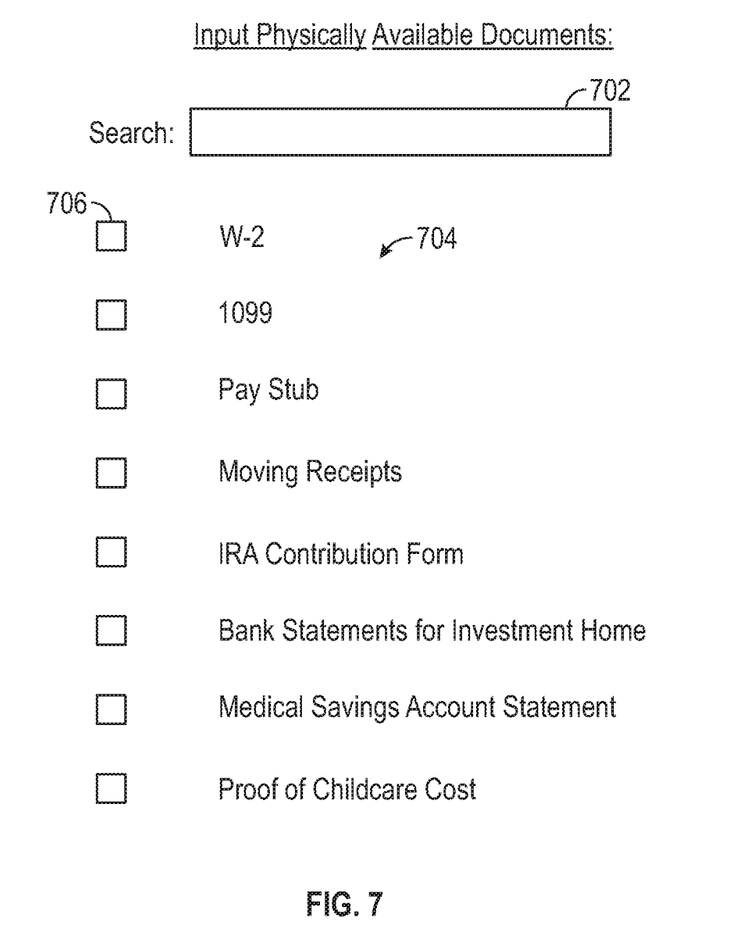
FIG. 7 illustrates an interface by which a user may manually indicate physically available documents.

FIG. 7 illustrates one possible example of a user interface by which a user may indicate physically available documents 230 to processor 106 of computer 102. A search bar 702 allows a user to perform a text search for a document he possesses. Electronic checkboxes 706 may be selected from list 704 of common and/or previously used documents. Further embodiments may allow for user entry of custom available documents, along with indication of which attributes and/or necessary resources 210 a custom document satisfies. A similar interface could be used for indicating ownership of electronically available documents 220, in embodiments.

Embodiments of the invention may calculate time to complete a tax return application based on further information not expressly described above, such as occupation, age, retirement status, tax return application preparation experience, or recent change of address. Any or all of these or additional data points may be input by a user to computer 102, retrieved from data base 130 or internet 132, or inferred from other sources of data such as social media accounts.

Many different arrangements of the various components depicted, as well as components not shown, are possible without departing from the scope of the claims below. Embodiments of the invention have been described with the intent to be illustrative rather than restrictive. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims. Lengths of time in embodiments of the invention may be measure in any unit including but not limited to minutes, hours, and days without departing from the scope of the invention.

Having thus described various embodiments of the invention, what is claimed as new and desired to be protected by Letters Patent includes the following:

1. A computer implemented method of producing a user interface for informing a user of an estimated amount of time remaining until completion of a tax return application, the method comprising the steps of:

collecting, by at least one processor, a plurality of deductions to be completed on the tax return application;

generating, by the at least one processor, a set of necessary resources for the plurality of deductions;

populating, by the at least one processor, a set of electronically available documents from the set of necessary resources;

generating, by the at least one processor, a set of physically available documents from the set of necessary resources based on the user's input;

determining, by the at least one processor, a set of remaining resources from the set of necessary resources based, at least in part, on the set of electronically available documents and the set of physically available documents;

determining, by the at least one processor, an estimated time to complete the tax return application based, at least in part, on the set of electronically available documents, the set of physically available documents, a checkpoint, and the set of remaining resources, wherein the determination of the estimated time to complete the tax return is based at least in part on tests previously run with sample users to determine average times for completion of tax return applications with electronically available documents, physically available documents, and remaining resources, wherein the sample users are selected based on having at least one deduction in common with the user and are restricted to sample users which submitted documents having the at least one deduction in common in the current calendar year, wherein the determination of the estimated time to complete the tax return is further based at least in part on a transformation of at least one of the set of physically available documents to the set of electronically available documents via optical character recognition, wherein the checkpoint is indicative of at least one of a threshold percent completion of the tax return application and an expiration threshold of a number of expired minutes;

generating, by the at least one processor, a user interface including an updated expression of the determined time to complete the tax return application and a reason for generating the updated expression; and displaying, by the at least one processor, the user interface to the user.

2. The method of claim 1, further comprising the steps of:

calculating, by the at least one processor, an adjusted time to complete the tax return application based, at least in part, on an updated plurality of deductions to be completed, an updated set of electronically available documents, an updated set of physically available documents, and an updated set of remaining resources;

generating, by the at least one processor, an adjusted user interface including an expression of the calculated adjusted time to complete the tax return application; and displaying, by the at least one processor, the adjusted user interface to the user.

3. The method of claim 2, wherein the adjusted user interface is generated in response to a user request.

4. The method of claim 1, further including the step of identifying, by the at least one processor, the achievement of the checkpoint, wherein the checkpoint is further indicative of an accomplishment selected from a group consisting of completion of a deduction, the transformation of the physically available document to the electronically available document, and acquisition of a remaining resource.

5. The method of claim 4, further including the steps of:
generating, by the at least one processor, an adjusted user interface including an expression of a calculated adjusted time to complete the tax return application upon achievement of the checkpoint; and
displaying, by the at least one processor, the adjusted user interface to the user.

6. The method of claim 4, wherein the checkpoint is achieved upon acquisition of a resource in the set of remaining resources.

7. The method of claim 1, wherein the plurality of deductions to be completed are at least partially selected by the user.

8. The method of claim 1, wherein the set of electronically available documents are determined without user input.

9. The method of claim 1, wherein at least one document in the set of electronically available documents was stored in a remote database by the user during completion of a prior tax return application.

10. The method of claim 1,
further including the step of receiving, by the at least one processor, a physically available document from an optical capture device,
wherein upon uploading, the physically available document is removed from the set of physically available documents and added to the list of electronically available documents.

11. One or more non-transitory computer readable media storing computer executable instructions that, when executed by a processor, perform a method of producing a user interface estimating an amount of time until completion of a tax return application, the method comprising the steps of:
collecting a plurality of deductions to be completed on the tax return application;
generating a set of necessary resources for the plurality of deductions;
populating a set of electronically available documents from the set of necessary resources;
generating a set of physically available documents from the set of necessary resources based on the user's input;
determining a set of remaining resources based on the set of necessary resources, the set of electronically available documents, and the set of physically available documents;
determining a time to complete the tax return application based, at least in part, on the set of electronically available documents, the set of physically available documents, a checkpoint, and the set of remaining resources,
wherein the determination of the estimated time to complete the tax return is based at least in part on tests previously run with sample users to determine average times for completion of tax return applications with electronically available documents, physically available documents, and remaining resources,
wherein the sample users are selected based on having at least one deduction in common with the user and are restricted to sample users which submitted documents having the at least one deduction in common in the current calendar year,
wherein the determination of the estimated time to complete the tax return is further based at least in part on a transformation of at least one of the set of physically available documents to the set of electronically available documents via optical character recognition,
wherein the checkpoint is indicative of at least one of a threshold percent completion of the tax return application and an expiration threshold of a number of expired minutes;
generating a user interface including an updated expression of the determined time to complete the tax return application and a reason for generating the updated expression; and
displaying the user interface to the user.

12. The computer readable media of claim 11, wherein the step of determining the time to complete the tax return application is performed further based, at least in part, on an average time required for completion of tax return applications by a set of other users.

13. The computer readable media of claim 12, wherein the set of other users are selected based, at least in part, on having collected a remaining resource in common with a remaining resource in the user's set of remaining resources.

14. The computer readable media of claim 11, wherein the step of determining the time to complete the tax return application is performed further based, at least in part, on a pace of completion of the plurality of deductions to be completed.

15. The computer readable media of claim 11, wherein the step of determining the time to complete the tax return application is performed further based, at least in part, on a length of time required for the user to complete a previous tax return application.

16. A method of producing a user interface estimating an amount of time remaining until completion of a tax return application, the method comprising the steps of:
selecting, by the user, a plurality of deductions to be completed on the tax return application;
generating a set of necessary resources for the plurality of deductions,
populating a set of electronically available documents from the set of necessary resources;
selecting, by the user, a set of physically available documents from the set of necessary resources;
determining a set of remaining resources from the set of necessary documents,
wherein the remaining resources are not satisfied by the set of electronically available documents nor the set of physically available documents;
determining a time to complete the tax return application based, at least in part, on the set of electronically available documents, the set of physically available documents, a checkpoint, and the set of remaining resources,
wherein the determination of the estimated time to complete the tax return is based at least in part on tests previously run with sample users to determine average times for completion of tax return applications with electronically available documents, physically available documents, and remaining resources,
wherein the sample users are selected based on having at least one deduction in common with the user and are restricted to sample users which submitted documents having the at least one deduction in common in the current calendar year,
wherein the determination of the estimated time to complete the tax return is further based at least in part on a transformation of at least one of the set of physically available documents to the set of electronically available documents via optical character recognition, wherein the checkpoint is indicative of at least one of a threshold percent completion of the tax return application and an expiration threshold of a number of expired minutes;

generating a user interface including an updated expression of the determined time to complete the tax return application and a reason for generating the updated expression; and displaying the user interface to the user.

17. The method of claim 16, wherein the expression of the determined time to complete the tax return application included in the user interface is selected from a group consisting of a countdown timer, a graphical clock, and a textual statement of an estimated time remaining.

18. The method of claim 16, wherein the user interface further comprises an indication of the percent completion of the tax return application.

19. The method of claim 16, wherein the user interface further comprises an indication of the set of remaining resources.

20. The method of claim 16, further comprising the steps of:

calculating an adjusted time to complete the tax return application based, at least in part, on an updated plurality of deductions to be completed, an updated set of electronically available documents, an updated set of physically available documents, and an updated set of remaining resources;

generating an adjusted user interface including an expression of the calculated adjusted time to complete the tax return application; and displaying the adjusted user interface to the user.

* * * * *